US010008212B2

(12) United States Patent
Lynch et al.

(10) Patent No.: US 10,008,212 B2
(45) Date of Patent: Jun. 26, 2018

(54) SYSTEM AND METHOD FOR UTILIZING AUDIO ENCODING FOR MEASURING MEDIA EXPOSURE WITH ENVIRONMENTAL MASKING

(75) Inventors: Wendell Lynch, East Lansing, MI (US); Michael Tenbrock, Columbia, MD (US); Alan Neuhauser, Silver Spring, MD (US); Anand Jain, Ellicott City, MD (US); William K. Krug, Daytona Beach, FL (US)

(73) Assignee: The Nielsen Company (US), LLC, New York, NY (US)

( * ) Notice: Subject to any disclaimer, the term of this patent is extended or adjusted under 35 U.S.C. 154(b) by 1096 days.

(21) Appl. No.: 13/338,588

(22) Filed: Dec. 28, 2011

(65) Prior Publication Data

US 2012/0239407 A1 Sep. 20, 2012

Related U.S. Application Data (63) Continuation-in-part of application No. 12/425,464, filed on Apr. 17, 2009, and a continuation-in-part of application No. 12/425,556, filed on Apr. 17, 2009.

(51) Int. Cl.
*G10L 19/00* (2013.01)
*G10L 19/018* (2013.01)
(Continued)

(52) U.S. Cl.
CPC ...... *G10L 19/018* (2013.01); *G06F 17/30743* (2013.01); *G06Q 30/02* (2013.01); *G06Q 30/0201* (2013.01)

(58) Field of Classification Search
CPC ....... H04N 21/44213; H04N 21/44218; H04N 21/44222; H04N 21/8126; H04N 21/858;
(Continued)

(56) References Cited

U.S. PATENT DOCUMENTS 4,930,011 A * 5/1990 Kiewit ............................ 725/10
5,113,437 A * 5/1992 Best et al. .................... 380/253
(Continued)

FOREIGN PATENT DOCUMENTS

| EP | 0366381 | 5/1990 |
|----|---------|--------|
| WO | 9512278 | 5/1995 |
| WO | 2007126992 | 11/2007 |

OTHER PUBLICATIONS

Arbitron, Critical Band Encoding Technology Audio Encoding System from Arbitron, Technical Overview, 1050-1054 E, Feb. 2008 v3.*

(Continued)

*Primary Examiner* — Richard N Scheunemann
*Assistant Examiner* — Tyler W Knox
(74) *Attorney, Agent, or Firm* — Hanley, Flight & Zimmerman, LLC (57) ABSTRACT

An audio beacon system, apparatus and method for collecting information on a panelist's exposure to media. An audio beacon is configured as on-device encoding technology that is operative in a processing device (e.g., cell phone, PDA, PC) to enable the device to encode an environmental sound and transmit it for a predetermined period of time. The acoustically transmitted data is received and processed by a portable audience measurement device, such as Arbitron's Personal People Meter™ ("PPM"), or other specially equipped portable device to enable audience measurement systems to achieve higher levels of detail on panel member activity and greater association of measurement devices to their respective users.

19 Claims, 8 Drawing Sheets

(51) Int. Cl.
  *G06F 17/30* (2006.01)
  *G06Q 30/02* (2012.01)

(58) Field of Classification Search
  CPC ............ H04N 21/4782; H04N 21/233; H04N 21/234; H04N 21/235; H04N 21/236; H04N 21/41407; H04N 21/426; H04N 21/44209; H04N 21/44227; H04N 21/8358; G10K 11/175; G06Q 30/0267; G06Q 30/02; G06Q 30/0201; H04K 2203/12; H04K 2203/18; H04K 1/02; G06F 17/3074; G06F 17/30743; G06F 17/30749; G06F 17/30755; G06F 17/30778; G06F 21/10; G10L 19/018; G10L 19/00; G10L 21/00; G11B 27/28
  USPC ............ 725/9, 14, 18, 20, 22, 31; 381/73.1; 455/2.01; 380/252, 254; 702/189
  See application file for complete search history.

(56) References Cited

U.S. PATENT DOCUMENTS

| | | | | |
|---|---|---|---|---|
| 5,319,735 | A * | 6/1994 | Preuss et al. | 704/205 |
| 5,450,490 | A * | 9/1995 | Jensen | H04H 20/31 380/241 |
| 5,481,294 | A * | 1/1996 | Thomas et al. | 725/20 |
| 5,483,276 | A * | 1/1996 | Brooks et al. | 725/10 |
| 5,574,962 | A * | 11/1996 | Fardeau et al. | 455/2.01 |
| 5,579,124 | A * | 11/1996 | Aijala et al. | 386/201 |
| 5,581,800 | A | 12/1996 | Fardeau | |
| 5,737,025 | A * | 4/1998 | Dougherty et al. | 348/473 |
| 5,828,325 | A * | 10/1998 | Wolosewicz et al. | 341/52 |
| 5,917,425 | A * | 6/1999 | Crimmins et al. | 340/8.1 |
| 5,945,932 | A * | 8/1999 | Smith et al. | 341/51 |
| 6,154,484 | A * | 11/2000 | Lee et al. | 375/130 |
| 6,160,245 | A * | 12/2000 | Broker | D06F 39/005 219/412 |
| 6,175,627 | B1 * | 1/2001 | Petrovic et al. | 380/42 |
| 6,272,176 | B1 * | 8/2001 | Srinivasan | H04H 20/31 375/240 |
| 6,421,445 | B1 * | 7/2002 | Jensen et al. | 380/253 |
| 6,505,160 | B1 * | 1/2003 | Levy et al. | 704/270 |
| 6,539,393 | B1 * | 3/2003 | Kabala | |
| 6,650,761 | B1 * | 11/2003 | Rodriguez | G06F 17/30876 382/100 |
| 6,845,360 | B2 * | 1/2005 | Jensen et al. | 704/500 |
| 6,862,355 | B2 * | 3/2005 | Kolessar et al. | 380/253 |
| 6,871,180 | B1 * | 3/2005 | Neuhauser et al. | |
| 6,968,564 | B1 * | 11/2005 | Srinivasan | H04H 20/31 381/97 |
| 6,975,835 | B1 * | 12/2005 | Lake et al. | 455/3.01 |
| 6,996,237 | B2 | 2/2006 | Jensen | |
| 7,012,652 | B1 * | 3/2006 | Weber | H04N 5/44 348/632 |
| 7,174,151 | B2 * | 2/2007 | Lynch et al. | 455/404.1 |
| 7,222,071 | B2 * | 5/2007 | Neuhauser et al. | 704/231 |
| 7,239,981 | B2 | 7/2007 | Kolessar | |
| 7,266,697 | B2 * | 9/2007 | Kirovski | G10L 19/018 380/201 |
| 7,316,025 | B1 * | 1/2008 | Aijala et al. | 725/18 |
| 7,420,464 | B2 * | 9/2008 | Fitzgerald et al. | 340/539.13 |
| 7,460,827 | B2 * | 12/2008 | Schuster et al. | 455/2.01 |
| 7,471,987 | B2 * | 12/2008 | Crystal et al. | 700/94 |
| 7,483,835 | B2 * | 1/2009 | Neuhauser et al. | 704/273 |
| 7,483,975 | B2 | 1/2009 | Kolessar | |
| 7,509,115 | B2 | 3/2009 | Lynch | |
| 7,627,872 | B2 * | 12/2009 | Hebeler et al. | 719/315 |
| 7,640,141 | B2 | 12/2009 | Kolessar | |
| 7,685,204 | B2 * | 3/2010 | Rogers | G06F 17/30766 707/758 |
| 7,711,838 | B1 * | 5/2010 | Boulter et al. | 709/231 |
| 7,877,438 | B2 * | 1/2011 | Schrempp et al. | 709/203 |
| 7,908,133 | B2 | 3/2011 | Neuhauser | |
| 7,961,881 | B2 | 6/2011 | Jensen | |
| 7,970,164 | B2 * | 6/2011 | Nakamura | G06T 1/0085 382/100 |
| RE42,627 | E | 8/2011 | Neuhauser | |
| 8,000,677 | B2 | 8/2011 | Lynch | |
| 8,181,194 | B2 * | 5/2012 | Houston | 725/14 |
| 8,878,191 | B2 * | 11/2014 | Mouli | 257/77 |
| 2001/0019618 | A1 * | 9/2001 | Rhoads | 382/100 |
| 2001/0055391 | A1 * | 12/2001 | Jacobs | G06Q 30/0601 380/241 |
| 2002/0107596 | A1 * | 8/2002 | Thomas | G06F 17/30887 700/94 |
| 2002/0175665 | A1 * | 11/2002 | O'Grady | G06F 1/1632 323/371 |
| 2002/0188746 | A1 * | 12/2002 | Drosset et al. | 709/231 |
| 2003/0005430 | A1 * | 1/2003 | Kolessar | 725/9 |
| 2003/0081781 | A1 | 5/2003 | Jensen | |
| 2004/0003102 | A1 * | 1/2004 | Duvall et al. | 709/231 |
| 2004/0019463 | A1 * | 1/2004 | Kolessar | H04H 60/31 702/189 |
| 2004/0137929 | A1 * | 7/2004 | Jones et al. | 455/517 |
| 2004/0139047 | A1 * | 7/2004 | Rechsteiner | G11B 27/034 |
| 2004/0169581 | A1 * | 9/2004 | Petrovic | G10L 19/018 340/5.2 |
| 2005/0054285 | A1 * | 3/2005 | Mears | G06Q 30/02 455/2.01 |
| 2005/0203798 | A1 * | 9/2005 | Jensen et al. | 705/14 |
| 2005/0216509 | A1 * | 9/2005 | Kolessar et al. | 707/104.1 |
| 2005/0234774 | A1 * | 10/2005 | Dupree | 705/14 |
| 2006/0059277 | A1 * | 3/2006 | Zito | G06Q 30/02 710/15 |
| 2007/0100483 | A1 * | 5/2007 | Kentish et al. | 700/94 |
| 2007/0157228 | A1 * | 7/2007 | Bayer | G06Q 30/02 725/34 |
| 2007/0180063 | A1 * | 8/2007 | Qureshey et al. | 709/219 |
| 2007/0187505 | A1 * | 8/2007 | Rhoads | G06K 9/00577 235/454 |
| 2007/0250716 | A1 * | 10/2007 | Brunk | G06F 21/10 713/176 |
| 2007/0266395 | A1 * | 11/2007 | Lee | H04H 60/31 725/11 |
| 2007/0288277 | A1 * | 12/2007 | Neuhauser et al. | 705/7 |
| 2007/0288478 | A1 * | 12/2007 | DiMaria | G06F 17/30038 |
| 2008/0052083 | A1 * | 2/2008 | Shalev | G06F 17/30855 704/500 |
| 2008/0077469 | A1 * | 3/2008 | Philport et al. | 705/10 |
| 2008/0086304 | A1 | 4/2008 | Neuhauser | |
| 2008/0101454 | A1 * | 5/2008 | Luff | H04N 7/17309 375/240 |
| 2008/0112596 | A1 * | 5/2008 | Rhoads | G06K 9/00577 382/115 |
| 2008/0126420 | A1 * | 5/2008 | Wright et al. | 707/104.1 |
| 2008/0167968 | A1 * | 7/2008 | Cue | G06Q 30/06 705/26.5 |
| 2008/0187188 | A1 * | 8/2008 | Beletski | H04H 60/37 382/124 |
| 2008/0190267 | A1 * | 8/2008 | Rechsteiner | G10H 1/0041 84/609 |
| 2008/0243590 | A1 * | 10/2008 | Rich | 705/10 |
| 2009/0037575 | A1 * | 2/2009 | Crystal | G06Q 30/02 709/224 |
| 2009/0077579 | A1 * | 3/2009 | Li | G06Q 30/02 725/34 |
| 2009/0192803 | A1 * | 7/2009 | Nagaraja | G10L 19/012 704/278 |
| 2009/0235307 | A1 * | 9/2009 | White | G06Q 30/0277 725/34 |
| 2009/0253457 | A1 * | 10/2009 | Seguin | H03G 9/005 455/550.1 |
| 2009/0304182 | A1 * | 12/2009 | Choi et al. | 380/252 |
| 2010/0146445 | A1 * | 6/2010 | Kraut | H04N 5/60 715/821 |
| 2010/0169904 | A1 * | 7/2010 | Nielsen | H04H 60/29 725/9 |
| 2010/0172539 | A1 * | 7/2010 | Sugimoto | G06T 1/005 382/100 |
| 2010/0268540 | A1 * | 10/2010 | Arshi et al. | 704/500 |

(56) References Cited

U.S. PATENT DOCUMENTS

| | | | | |
|---|---|---|---|---|
| 2010/0268573 | A1* | 10/2010 | Jain et al. | 705/10 |
| 2010/0315236 | A1* | 12/2010 | Sakargayan | H04M 1/72547 340/571 |
| 2011/0138326 | A1* | 6/2011 | Roberts | G06Q 30/02 715/808 |
| 2011/0214143 | A1* | 9/2011 | Rits | G06F 17/30026 725/34 |
| 2011/0314486 | A1* | 12/2011 | Lu | H04H 60/37 725/14 |

OTHER PUBLICATIONS

Non-Patent Literature Search 1 of Google Scholar: "measuring media exposure, watermark signal duration, user device volume," Jan. 18, 2018.*
Non-Patent Literature Search 2 of Google Scholar: "watermarking duration and volume," Jan. 18, 2018.*
Non-Patent Literature Search 3 of Google Scholar: "audio watermarking duration and volume," Jan. 18, 2018.*
Non-Patent Literature Search 4 of Google Scholar: "switching watermarking duration based on user device volume," Jan. 18, 2018.*
International Searching Authority, "International Preliminary Report on Patentability", issued in connection with International Application No. PCT/US2012/071966, dated Jul. 10, 2014 (7 pages).
Arbitron, Critical Band Encoding Technology Audio Encoding System from Arbitron, Technical Overview, 1050-1054 E, Feb. 2008.
Arbitron, Electronic Audience Measurement for the $21^{st}$ Century, 03EUR199 2003.
Arbitron, PPM Analysis Software, Bringing Detailed Audience Data into Clear Focus, 05PPM891 1M, Aug. 2005.
Arbitron, Radio Measurement System Essentials, 06PPM282 May 2006.
Arbitron, Simon Malls Shopper Profile, presented by Bill Rose, Vice President and General Manager Arbitron New Ventures, 2004.
National Association of Broadcasters, Radio TechCheck, Arbitron PPM Information for Broadcast Engineers, Mar. 24, 2008.
Arbitron, What Happens When New Music Gets Played, The Impact of New Songs on the Country Radio Audience, insights from PPM, 07CUS027, 2007.
Simpson Nicola, Portable Privacy Meters, Personal media choice and the Arbitron PPM, University of Pennsylvania webpages, 2003.
Arbitron, What Happens When the Spots Come on, The Impact of Commercials on the Radio Audience, insights from PPM, 06PPM847, Sep. 2006.
Arbitron, The Manchester 300, Out of the Lab and into the Field, A Report on the Extended Field Test of Arbitron PPM, archives org, 2003.
Arbitron, The Portable People Meter System, Arbitron webpages, Mar. 26, 2006.
Coagula, image synth, archives organization, Mar. 19, 2008, Archives.org Mar. 19, 2008.
Cannam et al., The Sonic Visualizer—A visualization platform for semantic descriptions from musical signals, ismir 2006.
Johnston James, Transform Coding of Audio Signals Using Perceptual Noise Criteria, IEEE vol. 4, No. 2, Feb. 1988.
Craig Stuart Sapp, Science and Music Seminar, University of Cambridge, Nov. 28, 2006.
Patchen et al., A full year of audience research with PPM, What we have learned so far, archives—org, 2007.
Want et al., An Overview of the PARCTAB Ubiquitous computing experiment, IEEE, 1070-9916-95, 1995.
Wan et al., Multimedia at Work, Advertising Insertion in Sports Webcasts, Qibin Sun, Infocomm Research, IEEE, 1070-986X-07, 2007.
Collberg et al., Watermarking, Tamper-Proofing and Obfuscation—Tools Software Protection, University of Arizona Computer Science Technical Report Mar. 2000, 2000.
International Search Report in PCT/US10/31451 dated Jun. 28, 2010.
International Search Report & Written Opinion in PCT/US12/71966 dated Mar. 1, 2013.
United States Patent and Traemark Office, "Final Office Action", issued in connection with U.S. Appl. No. 12/425,556, dated Sep. 4, 2015 (41 pages).
European Patent Office, "Extended European Search Report," issued in connection with corresponding application No. EP 10765293.5, dated Jun. 29, 2012, 9 pages.
International Bureau, "International Preliminary Report on Patentability," issued in connection with corresponding application No. PCT/US2010/031463, dated Oct. 18, 2011, 5 pages.
International Searching Authority, "International Search Report and Written Opinion of the International Searching Authority," issued in connection with corresponding application No. PCT/US2010/031463, filed Jun. 9, 2010, 7 pages.
European Patent Office, "Extended European Search Report," issued in connection with application No. EP 10765286.9, dated Jun. 11, 2013, 5 pages.
International Bureau, "International Preliminary Report on Patentability," issued in connection with application No. PCT/US2010/031451, dated Oct. 18, 2011, 5 pages.
United States Patent and Trademark Office, "Office Action," issued in connection with U.S. Appl. No. 12/425,464, dated May 10, 2013, 30 pages.
United States Patent and Trademark Office, "Office Action," issued in connection with U.S. Appl. No. 12/425,464, dated Jul. 29, 2011, 16 pages.
United States Patent and Trademark Office, "Office Action," issued in connection with U.S. Appl. No. 12/425,464, dated Nov. 18, 2011, 37 pages.
United States Patent and Trademark Office, "Office Action," issued in connection with U.S. Appl. No. 12/425,464, dated Oct. 3, 2012, 31 pages.
United States Patent and Trademark Office, "Office Action," issued in connection with U.S. Appl. No. 12/425,464, dated Oct. 3, 2013, 39 pages.
MacRumors forum, "How to sync video audio in VLC," Mar. 6, 2008, accessed at <http://forums.macrumors.com/showthread.php?t=262728>, 4 pages.
IP Australia, Australian Government, "Patent Examination Report No. 1," issued in connection with application No. AU 2010236208, on May 7, 2014, 4 pages.
IP Australia, "Notice of Acceptance", issued in connection with Australian Patent Application No. 2010236208, dated May 29, 2015 (2 pages).
Unites States Patent and Trademark Office, "Non-Final Office Action", issued in connection with U.S. Appl. No. 12/425,556, dated Jul. 19, 2011 (14 pages).
Unites States Patent and Trademark Office, "Final Office Action", issued in connection with U.S. Appl. No. 12/425,556, dated Jan. 12, 2012 (23 pages).
Unites States Patent and Trademark Office, "Non-Final Office Action", issued in connection with U.S. Appl. No. 12/425,556, dated Aug. 31, 2012 (31 pages).
Unites States Patent and Trademark Office, "Non-Final Office Action", issued in connection with U.S. Appl. No. 12/425,556, dated Apr. 18, 2013 (41 pages).
Unites States Patent and Trademark Office, "Final Office Action", issued in connection with U.S. Appl. No. 12/425,556, dated Oct. 2, 2013 (35 pages).
Unites States Patent and Trademark Office, "Non-Final Office Action", issued in connection with U.S. Appl. No. 12/425,556, dated Jan. 14, 2015 (34 pages).
Wikipedia, "History of the Internet", Wikipedia Webpages, <http://en.wikipedia.org/wiki/History_of_the_Internet>. Sep. 22, 2013 (29 pages).

(56) References Cited

OTHER PUBLICATIONS

United States Patent and Trademark Office, "Advisory Action", issued in connection with U.S. Appl. No. 12/425,464, dated Mar. 1, 2012 (3 pages).

United States Patent and Trademark Office, "Notice of Abandonment", issued in connection with U.S. Appl. No. 12/425,464, dated May 16, 2014 (2 pages).

* cited by examiner

| | Time → | 0-3 sec | 4 sec | 180 — 300 sec | 301-315 sec | 316-599 sec | 600 sec |
|---|---|---|---|---|---|---|---|
| 201 | Activities → | Video Loaded | Video Played | | Ad served | Video continues | Video End |
| 202 | Audio Beacons detected by portable device → | Continuous Audio representing the website (e.g., Hulu.com) | | | | | |
| 203 | Additional beacon events → | URLs (Hulu.com & Video ID) | | | AD Event Beacon (co-relation URL) | | Video End Beacon |
| 204 | Audio matching events detected by portable device → | | Audio Signature Sample 1 | Audio Signature Sample 2 | Audio Signature Sample 3 (Content Match Achieved) | Same Signature Sample 4 (No Change) | Audio Signature Sample 5 (Different Content couldn't match) | Audio Signature Sample 5 (Same Video again) | No Signature (But Can't assume video is completed) |
| 205 | Overlay portable device data | X | | X | X | X | X |
| 206 | End-User Experience | URL of site where the video was played | | Content Matched | Ad Served | | Video Played till the End |

SYSTEM AND METHOD FOR UTILIZING AUDIO ENCODING FOR MEASURING MEDIA EXPOSURE WITH ENVIRONMENTAL MASKING

RELATED APPLICATIONS

The present application is a continuation-in-part of U.S. patent application Ser. No. 12/425,464, titled "System and Method for Utilizing Audio Beaconing in Audience Measurement" filed Apr. 17, 2009, and U.S. patent application Ser. No. 12/425,556, titled "System and Method for Utilizing Supplemental Audio Beaconing in Audience Measurement," also filed on Apr. 17, 2009. Both applications are assigned to the assignee of the present application and are incorporated by reference in their entireties herein

TECHNICAL FIELD

The present disclosure relates to systems and processes for communicating and processing data, and, more specifically, to communicate media data exposure that may include coding that provides media and/or market research.

BACKGROUND INFORMATION

The use of global distribution systems such as the Internet for distribution of digital assets such as music, film, computer programs, pictures, games and other content continues to grow. In many instances, media offered via traditional broadcast mediums is supplemented through similar media offerings through computer networks and the Internet. It is estimated that Internet-related media offerings will rival and even surpass traditional broadcast offerings in the coming years.

Techniques such as "watermarking" have been known in the art for incorporating information signals into media signals or executable code. Typical watermarks may include encoded indications of authorship, content, lineage, existence of copyright, or the like. Alternatively, other information may be incorporated into audio signals, either concerning the signal itself, or unrelated to it. The information may be incorporated in an audio signal for various purposes, such as identification or as an address or command, whether or not related to the signal itself.

There is considerable interest in encoding audio signals with information to produce encoded audio signals having substantially the same perceptible characteristics as the original unencoded audio signals. Recent successful techniques exploit the psychoacoustic masking effect of the human auditory system whereby certain sounds are humanly imperceptible when received along with other sounds.

Arbitron has developed a new and innovative technology called Critical Band Encoding Technology (CBET) that encompasses all forms of audio and video broadcasts in the measurement of audience participation. This technology dramatically increases the both the accuracy of the measurement and the quantity of useable and effective data across all types of signal broadcasts. CBET is an encoding technique that Arbitron developed and that embeds identifying information (ID code) or other information within the audio portion of a broadcast. An audio signal is broadcast within the actual audio signal of the program, in a manner that makes the ID code inaudible, to all locations the program is broadcast, for example, a car radio, home stereo, computer network, television, etc. This embedded audio signal or ID code is then picked up by small (pager-size) specially designed receiving stations called Portable People Meters (PPM), which capture the encoded identifying signal, and store the information along with a time stamp in memory for retrieval at a later time. A microphone contained within the PPM receives the audio signal, which contains within it the ID code.

Further disclosures related to CBET encoding may be found in U.S. Pat. No. 5,450,490 and U.S. Pat. No. 5,764,763 (Jensen et al.) in which information is represented by a multiple-frequency code signal which is incorporated into an audio signal based upon the masking ability of the audio signal. Additional examples include U.S. Pat. No. 6,871,180 (Neuhauser et al.) and U.S. Pat. No. 6,845,360 (Jensen et al.), where numerous messages represented by multiple frequency code signals are incorporated to produce and encoded audio signal. Other examples include U.S. Pat. No. 7,239,981 (Kolessar et al.). Each of the above-mentioned patents is incorporated by reference in its entirety herein.

The encoded audio signal described above is suitable for broadcast transmission and reception and may be adapted for Internet transmission, reception, recording and reproduction. When received, the audio signal is processed to detect the presence of the multiple-frequency code signal. Sometimes, only a portion of the multiple-frequency code signal, e.g., a number of single frequency code components, inserted into the original audio signal, is detected in the received audio signal. However, if a sufficient quantity of code components is detected, the information signal itself may be recovered.

Other means of watermarking have been used in various forms to track multimedia over computer networks and to detect if a user is authorized to access and play the multimedia. For certain digital media, metadata is transmitted along with media signals. This metadata can be used to carry one or more identifiers that are mapped to metadata or actions. The metadata can be encoded at the time of broadcast or prior to broadcasting. Decoding of the identifier may be performed at a digital receiver. Other means of watermarking include the combination of digital watermarking with various encryption techniques known in the art.

While various encoding and watermarking techniques have been used to track and protect digital data, there have been insufficient advances in the fields of cross-platform digital media monitoring. Specifically, in cases where a person's exposure to Internet digital media is monitored in addition to exposure to other forms of digital media (e.g., radio, television, etc.), conventional watermarking systems have shown themselves unable to effectively monitor and track media exposure. Furthermore, there is a need to integrate exposure to digital media across platforms where the digital media includes formats that are not traditionally subject to audio encoding. Moreover, there is a need in the art to properly "mask" such signals using environmental sounds and/or sounds native to a device that is conducting beaconing processes.

SUMMARY

Accordingly, an audio beacon system, apparatus and method is disclosed for collecting information on a panelist's exposure to media. Under a preferred embodiment, the audio beacon is configured as on-device encoding technology that is operative in a panelist's processing device (e.g., cell phone, PDA, PC) to enable the device to acoustically transmit user/panelist data for a predetermined period of time. The acoustically transmitted data is received and processed by a portable audience measurement device, such as Arbitron's Personal People Meter™ ("PPM") or specially equipped cell phone, laptop etc., to enable audience measurement systems to achieve higher levels of detail on panel member activity and greater association of measurement devices to their respective panelists. Additionally, the acoustic transmissions are configured to utilize environmental sounds that are advantageous in being less obtrusive to users.

Additional features and advantages of the various aspects of the present disclosure will become apparent from the following description of the preferred embodiments, which description should be taken in conjunction with the accompanying drawings.

DETAILED DESCRIPTION

Figure 1A:
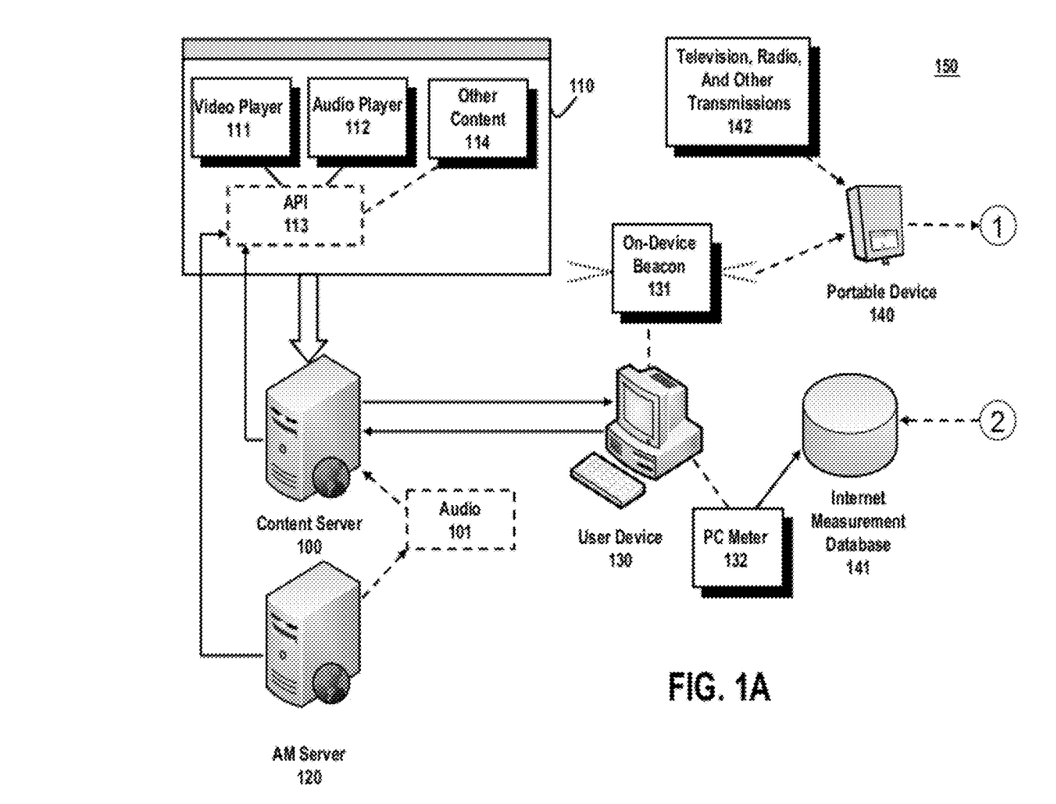
FIG. 1A is a block diagram illustrating a portion of an audio beaconing system under one exemplary embodiment.

FIG. 1A is an exemplary block diagram illustrating a portion of an audio beaconing system 150 under one embodiment, where a web page 110 is provided by a page developer and published on content server 100. The web page preferably contains an embedded video player 111 and audio player 112 (that is preferably not visible), together with an application programming interface (API) 113. Other content 114 (e.g., HTML, text, etc.) is also provided on web page 110, which may or may not be coupled through API 113. API 113 is preferably embodied as a set of routines, data structures, object classes and/or protocols provided by libraries and/or operating system services in order to support the video player 111 and audio player 112. Additionally, the API 113 may be language-dependent (i.e. available only in a particular programming language) or language-independent (i.e., can be called from several programming languages, preferably an assembly/C-level interface). Examples of suitable API's include Windows API, Java Platform API, OpenGL, DirectX, Simple DirectMedia Layer (SDL), YouTube API, Facebook API and iPhone API, among others.

In one preferred embodiment, API 113 is configured as a beaconing API object. Depending on the features desired, the API object may reside on an Audience Measurement (AM) server 120, so that the object may be remotely initialized, thus minimizing the objects software's exposure to possible tampering and to maintain security. Alternately, the API object can reside on the content server 100, where the API object may be initialized under increased performance conditions.

When initialized, API 113 can communicate the following properties: (1) the URL of the page playing the media, (2) URL of the media being served on the page, (3) any statically available media metadata, and (3) a timestamp. It is understood that additional properties may be communicated in API 113 as well. In one configuration of FIG. 1A, an initialization request is received by API 113, to create a code tone that is preferably unique for each website and encode it on a small inaudible audio stream. Alternatively, the AM server 120 could generate a pre-encoded audio clip 101, with a code tone, for each site and forward it on the content server 100 in advance.

The encoded audio stream would then travel from content server 100 to the web page 110 holding audio player 110. In a preferred embodiment, audio player 110 may be set by the page developer as an object instance, where the visible property of player 110 is oriented as "false" or set to a one-by-one dimension in order to minimize the visual interference of the audio player with the web page. The encoded audio stream may then be played out in parallel with the media content being received from the web page 110. The encoded audio stream would preferably repeat at predetermined time periods through an on-device beacon 131 resident on a user device 130 as long as the user is on the same website. The beacon 131, would enable device 130 to acoustically transmit the encoded audio stream so that a suitably configured portable device 140 (e.g., PPM) can receive and process the encoded information. Beacon 131 could be embedded into an audio player resident on a web page being viewed inside the browser on user device 130, or may be a stand-alone application on user device 130.

Figure 1B:
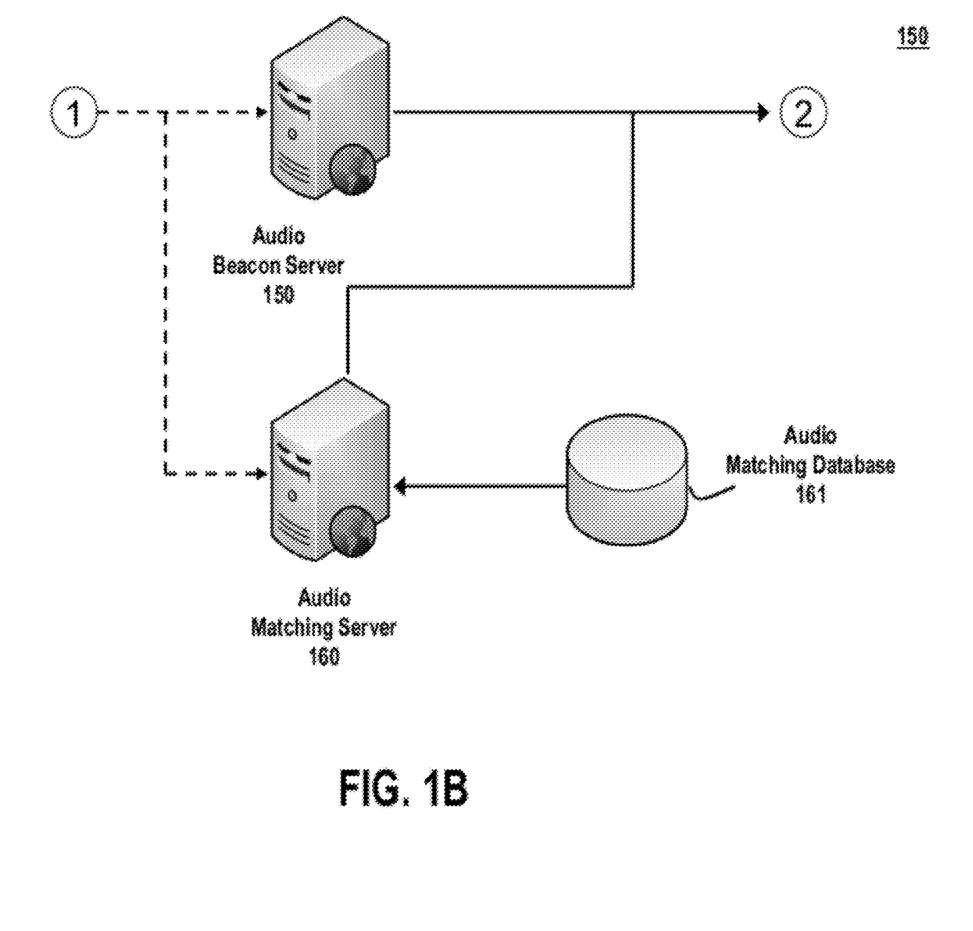
FIG. 1B is a block diagram illustrating another portion of an audio beaconing system under the embodiment illustrated in FIG. 1A.

A simplified example further illustrates the operation of the system 150 of FIGS. 1A-B under an alternate embodiment. User device 130 requests content (e.g., from "hulu.com") from server 100. When the content is received in user device 130, PC meter software 132 collects and transmits web measurement data to Internet measurement database 141. One example of a PC meter is comScore's Media Metrix™. software; further exemplary processes of web metering may be found in U.S. Pat. No. 7,493,655, titled "Systems for and methods of placing user identification in the header of data packets usable in user demographic reporting and collecting usage data" and U.S. Pat. No. 7,260,837, titled "Systems and methods for user identification, user demographic reporting and collecting usage data usage biometrics", both of which are incorporated by reference in their entirety herein.

As web measurement data is collected by PC meter 132, beacon 131 acoustically transmits encoded audio, which is received by portable device 140. In the exemplary embodiment, the encoding for the beacon transmission may include data such as a timestamp, portable device ID, user device ID, household ID, or any similar information. In addition to the beacon data, portable device 140 additionally receives multimedia data such as television and radio transmissions 142, which may or may not be encoded, at different times. If encoded (e.g., CBET encoding), portable device can forward transmissions 142 to audio matching server 160 (FIG. 1B) for decoding and matching with audio matching database 161. If transmissions 142 are not encoded, portable device 140 may employ sampling techniques for creating audio patterns or signatures, which may also be transmitted to audio matching server 160 for pattern matching using techniques known in the art.

Audio beacon server 150, shown in FIG. 1B, receives and processes/decodes beacon data from portable device 140. Under an alternate embodiment, it is possible to combine audio matching server 160 and audio beacon server 150 to collectively process both types of data. Data from Audio beacon server 150 and audio matching server 160 is transmitted to Internet measurement database 141, where the web measurement data could be combined with audio beacon data and data from the audio matching server to provide a comprehensive collection of panelist media exposure data.

Under another exemplary embodiment, the video and audio players of webpage 110 are configured to operate as Flash Video, which is a file format used to deliver video over the Internet using Adobe™ Flash Player. The Flash Player typically executes Shockwave Flash "SWF" files and has support for a scripting language called ActionScript, which can be used to display Flash Video from an SWF file. Because the Flash Player runs as a browser plug-in, it is possible to embed Flash Video in web pages and view the video within a web browser. Commonly, Flash Video files contain video bit streams which are a variant of the H.263 video standard, and include support for H.264 video standard (i.e., "MPEG-4 part 10", or "AVC"). Audio in Flash Video files ("FLV") is usually encoded as MP3, but can also accommodate uncompressed audio or ADPCM format audio.

Continuing with the embodiment, video beacons can be embedded within an action script that will be running within the video Flash Player's run time environment on web page 110. When an action script associated with web page 110 gets loaded as a result of the access to the page, the script gets activated and triggers a "video beacon", which extracts and store URL information on a server (e.g., content server 100), and launches the video Flash Player. By inserting an audio beacon in the same action script, the audio beacon will be triggered by the video player. Once triggered, the audio beacon may access AM server 120 to load a pre-recorded audio file containing a special embedded compatible code (e.g., CBET). This pre-recoded audio file would be utilized for beacon 131 to transmit for a given period of time (e.g., every x seconds).

As a result, the beacon 131 audio player runs as a "shadow player" in parallel to the video Flash Player. If a portable device 140 is in proximity to user device 130, portable device 140 will detect the code and reports it to audio beacon server 150. Depending on the level of cooperation between the audio and video beacon, the URL information can also be deposited onto beacon server 150 along with codes that would allow an audience measurement entity to correlate and/or calibrate various measurements with demographic data.

Under the present disclosure, media data may be processed in a myriad of ways for conducting customized panel research. As an example, each user device 130 may install on-device measurement software (PC meter 132) which includes one or more web activity monitoring applications, as well as beacon software 131. It is understood that the web activity monitoring application and the beacon software may be individual applications, or may be merged into a single application.

The web activity monitoring application collects web activities data from the user device 130 (e.g., site ID, video page URL, video file URL, start and end timestamp and any additional metadata about videosite information, URL information, time, etc.) and additionally assigns a unique ID, such as a globally unique identifier or "GUID", to each device. For the beacon 131, a unique composite ID may be assigned including a household ID ("HHID") and a unique user device ID for each device in the household (e.g., up to 10 devices for a family), as well as a portable device ID (PPMID). Panelist demographic data may be included for each web activity on the device.

Continuing with the example, beacon 131 emits an audio beacon code (ABC) for device in the household by encoding an assigned device ID number and acoustically sending it to portable device 140 to identify the device. Further details on the encoding is provided below. Portable device 140 collects the device ID and sends it to a database along with HHID and/or PPM ID and the timestamp. Preferably, a PPMID is always mapped to a HHID in the backend; alternately an HHID can be set within each PPMID.

The web activity monitoring and beacon applications may pass information to each other as needed. Both can upload information to a designated server for additional processing. A directory of panelists' devices is built to contain the GUID, HHID, and device ID for panel, and the directory could be used to correlate panelist demographic data and web measurement data.

Figure 2:
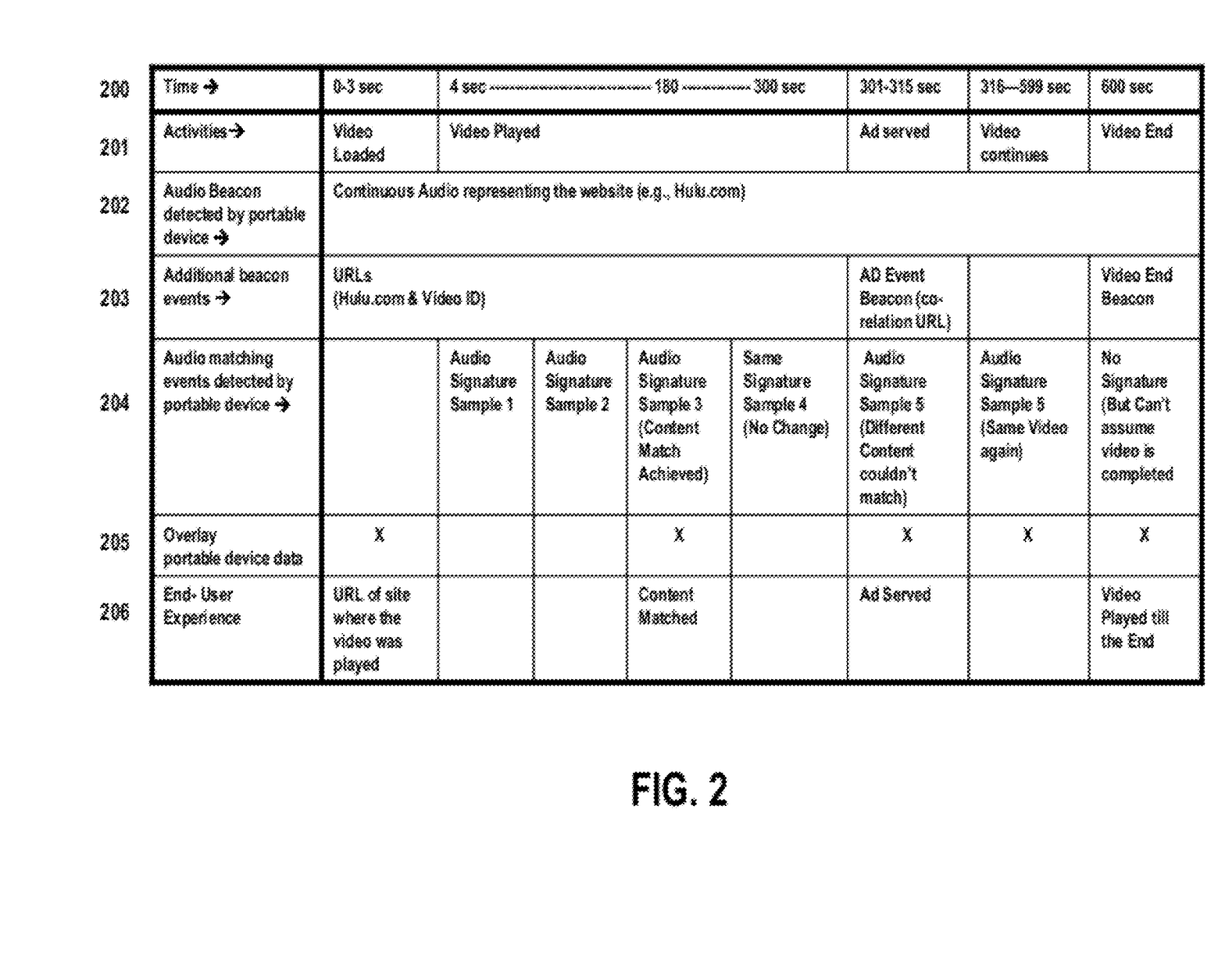
FIG. 2 is a tabular illustration of an audio beaconing and audio matching process under another exemplary embodiment.

Turning to FIG. 2, a tabular illustration of an audio beaconing and audio matching process under another an exemplary embodiment is provided. Specifically, the table illustrates a combination of audio beaconing and audio matching and its application to track a video on a content site, such as Hulu.com. FIG. 2. Timeline 200 shows in sections a scenario where a user/panelist plays a ten minute video on Hulu.com. Activities 201 shows actions taken in user system 150 where a video is loaded in the user device 130, and played. At the 5 minute mark (301 sec.), a 15 second advertisement is served. At the conclusion of the advertisement (316 sec.), the video continues to play until its conclusion (600 sec.).

During this time, audio beacon activities 202 are illustrated, where, under one embodiment, on-device beacon 131 transmits continuous audio representing the website (Hulu.com). In addition, beacon also transmits a timestamp, portable device ID, user device ID, household ID and/or any other data in accordance with the techniques described above. Under an alternate embodiment shown in 203, additional data may be transmitted in the beacon to include URLs and video ID's when a video is loaded and played. As the advertisement is served, an event beacon, which may include advertisement URL data, is transmitted. At the conclusion of the video, a video end beacon is transmitted to indicate the user/panelist is no longer viewing specific media.

When the video and advertisement is loaded and played, additional audio matching may occur in the portable device 140, in addition with audio matching processes explained above in relation to FIGS. 1A-B. Referring to audio matching events 204, portable device data 205 and end-user experience 206 of FIG. 2, portable device data (e.g., demographic ID data) is overlayed along with site information (URL, video ID, etc.) when a video is loaded. When the video is played, audio signatures may be sampled periodically by portable device 140, until a content match is achieved. The audio signatures may be obtained through encoding, pattern matching, or any other suitable technique. When a match is found, portable device data is overlayed to indicate that a content match exists. Further signature samples are taken to ensure that the same content is being viewed. When an advertisement is served, the sampled signature will indicate that different content is being viewed, at which point the portable device data is overlayed in the system. When the video resumes, the audio signature indicates the same video is played, and portable device data is overlayed through the end of the video as shown in FIG. 2.

As explained above, signature sampling/audio matching allows the system 150 to identify and incorporate additional data on the users/panelists and the content being viewed. Under a typical configuration, the content provider media (e.g., from content providers such as HULU®, FACE-BOOK®, etc.) may be sampled in advance to establish respective signatures for content and stored in a matching database (e.g., audio matching server 160). The portable device 140 would be equipped with audio matching software, so that, when a panelist is in the vicinity of user device 130, audio matching techniques are used to collect the signature, or "audio fingerprint" for the incoming stream. The signatures would then be matched against the signatures in the matching database to identify the content.

It is understood by those skilled in the art however, that encoding techniques may also be employed to identify content data. Under such a configuration, content is encoded prior to transmission to include data relating to the content itself and the originating content site. Additionally, data relating to possible referral sites (e.g., FACEBOOK®, MYSPACE®, etc.) may be included. Under one embodiment, a content management system may be arranged for content distributors to choose specific files for a corresponding referral site.

For the media data encoding, several advantageous and suitable techniques for encoding audience measurement data in audio data are disclosed in U.S. Pat. No. 5,764,763 to James M. Jensen, et al., which is assigned to the assignee of the present application, and which is incorporated by reference herein. Other appropriate encoding techniques are disclosed in U.S. Pat. No. 5,579,124 to Aijala, et al., U.S. Pat. Nos. 5,574,962, 5,581,800 and 5,787,334 to Fardeau, et al., U.S. Pat. No. 5,450,490 to Jensen, et al., and U.S. patent application Ser. No. 09/318,045, in the names of Neuhauser, et al., each of which is assigned to the assignee of the present application and all of which are incorporated by reference in their entirety herein.

Still other suitable encoding techniques are the subject of PCT Publication WO 00/04662 to Srinivasan, U.S. Pat. No. 5,319,735 to Preuss, et al., U.S. Pat. No. 6,175,627 to Petrovich, et al., U.S. Pat. No. 5,828,325 to Wolosewicz, et al., U.S. Pat. No. 6,154,484 to Lee, et al., U.S. Pat. No. 5,945,932 to Smith, et al., PCT Publication WO 99/59275 to Lu, et al., PCT Publication WO 98/26529 to Lu, et al., and PCT Publication WO 96/27264 to Lu, et al, all of which are incorporated by reference in their entirety herein.

Variations on the encoding techniques described above are also possible. Under one embodiment, the encoder may be based on a Streaming Audio Encoding System (SAES) that operates under a set of sample rates and is integrated with media transcoding automation technology, such as Telestream's FlipFactory™ software. Also, the encoder may be embodied as a console mode application, written in a general-purpose computer programming language such as "C". Alternately, the encoder may be implemented as a Java Native Interface (JNI) to allow code running in a virtual machine to call and be called by native applications, where the JNI would include a JNI shared library for control using Java classes. The encoder payloads would be configured using specially written Java classes. Under this embodiment, the encoder would use the information hiding abstractions of an encoder payload which defines a single message. Under a preferred embodiment, the JNI encoder would operate using a 44.1 kHz sample rate.

Examples of symbol configurations and message structures are provided below. One exemplary symbol configuration uses four data symbols and one end symbol defined for a total of five symbols. Each symbol may comprise five tones, with one tone coming from each of five standard Barks. One exemplary illustration of Bark scale edges (in Hertz), would be {920, 1080, 1270, 1480, 1720, 2000}. The bins are preferably spaced on a 4×3.90625 grid in order to provide lighter processing demands, particularly in cases using decoders based on 512 point fast Fourier transform (FFT). an exemplary bin structure is provided below:

Symbol 0: {248, 292, 344, 400, 468}

Symbol 1: {252, 296, 348, 404, 472}

Symbol 2: {256, 300, 352, 408, 476}

Symbol 3: {260, 304, 356, 412, 480}

End Marker Symbol: {264, 308, 360, 416, 484}

Regarding message structure, an exemplary message would comprise 20 symbols, each being 400 milliseconds in duration, for a total duration of 8 seconds. Under this embodiment, the first 3 symbols could be designated as match/check criteria symbols, which could be the simple sum of the data symbols or could be derived from an error correction or cyclical redundancy check algorithm. The following 16 symbols would then be designated as data symbols, leaving the last symbol as an end symbol used for a marker. Under this configuration, the total number of possible symbols would be $4^{16}$ or 4,294,967,296 symbols.

Variations in the algorithmic process for encoding are possible as well under the present disclosure. For example, a core sampling rate of 5.5125 kHz may be used instead of 8 kHz to allow down-sampling from 44.1 kHz to be efficiently performed without pre-filter (to eliminate aliasing components) followed by conversion filter to 48 kHz. Such a configuration should have no effect on code tone grid spacing since the output frequency generation is independent of the core sampling rate. Additionally, this configuration would limit the top end of the usable frequency span to about 2 kHz (as opposed to 3 kHz under conventional techniques) since frequency space should be left for filters with practical numbers of taps.

Under one embodiment, a 16 point overlap of a 256 point large FFT is used, resulting in amplitude updates every 2.9 milliseconds for encoding instead of every 2 milliseconds for standard CBET techniques. Accordingly, fewer large FFTs are calculated under a tighter bin resolution of 21.5 Hz instead of 31.25 Hz.

The psychoacoustic model calculations used for the encoding algorithm under the present disclosure may vary from traditional techniques as well. In one embodiment, bin spans of the clumps may be set by Bark boundaries instead of being wholly based on Critical Bandwidth criteria. By using Bark boundaries, a specific bin will not contribute to the encoding power level of multiple clumps, which provides less coupling between code amplitudes of adjacent clumps. When producing Equivalent Large FFTs, a comparison may be made of the most recent 16 point Small FFT results to a history of squared sums to simplify calculations.

For noise power computation, the encoding algorithm under the present disclosure would preferably use 3 bin values over a clump: the minimum bin power (MIN), the maximum bin power (MAX), and the average bin power (AVG). Under this arrangement, the bin values could be modeled as follows:

```
IF (MAX > (2 * MIN))
    PWR = MIN
ELSE
    PWR = AVG
```

Here, PWR may be scaled by a predetermined factor to produce masking energy.

A similar algorithm could also be used to create a 48 kHz native encoder using a core sample rate of 6 kHz and a large FFT bin resolution of 23.4375 Hz calculated every 2.67 milliseconds. Such a configuration would differ slightly in detection efficiency and inaudibility from the embodiments described above, but it is anticipated that the differences would be slight.

With regards to decoding, an exemplary configuration would include a software decoder based on a JNI shared library, which performs calculations up through the bin signal-to-noise ratios. Such a configuration would allow an external application to define the symbols and perform pattern matching. Such steps would be handled in a Java environment using an information hiding extraction of a decoder payload, where decoder payloads are created using specially written Java classes.

Figure 3:
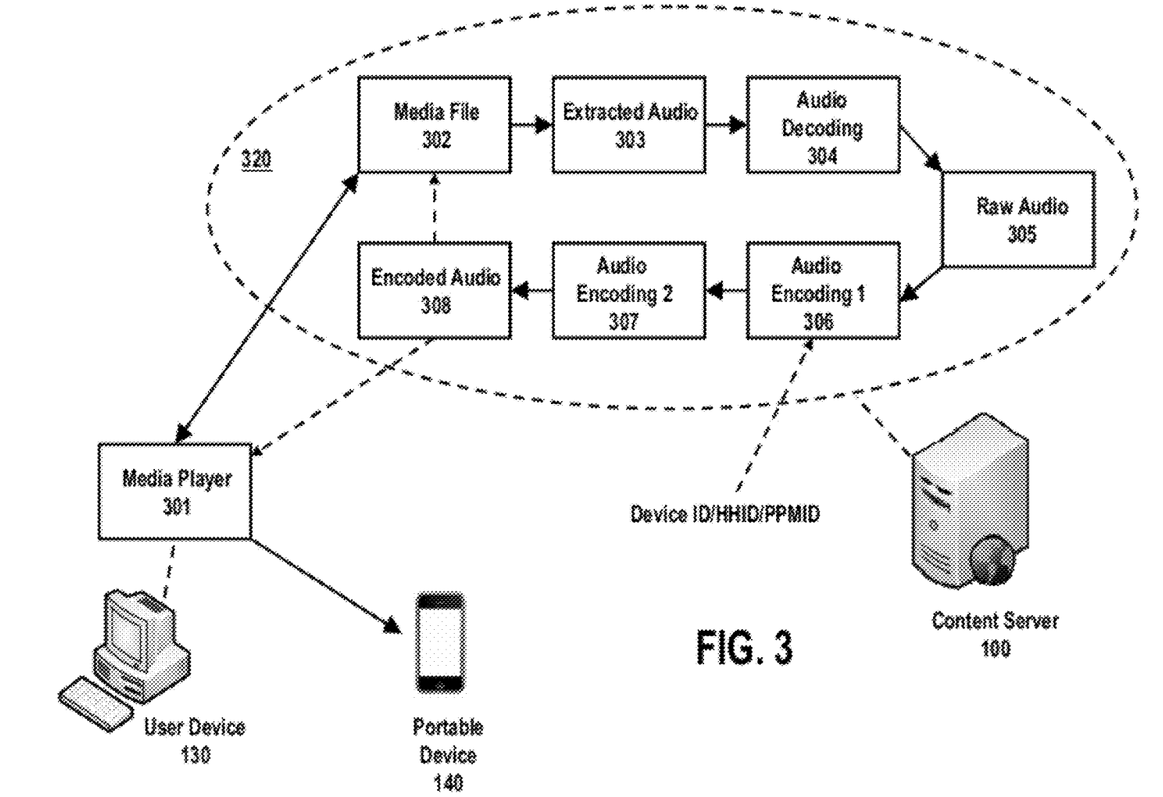
FIG. 3 illustrates a block diagram of a server-side encoding process under yet another exemplary embodiment.

Turning to FIG. 3, an exemplary server-side encoding embodiment is illustrated. In this example, content server 100 has content 320, which includes a media file 302 configured to be requested and played on media player 301 residing on user device 130. When media file 302 is initialized, audio is extracted from the media file and, if the audio is encoded (e.g., MP3 audio), subjected to audio decoding in 304 to produce raw audio 305. To encode the audio for beaconing, device ID, HHID and/or PPMID data is provided for first encoding 306 the data into the raw audio 305, using any suitable technique described above.

After the first encoding, the audio data is then subjected to a second encoding to transform the audio into a suitable format (e.g., MP3) to produce fully encoded audio 308, which is subsequently transmitted to media player 301 and beaconed to portable device 140. Alternately, encoded audio 308 may be produced in advance and stored as part of media file 302. During the encoding process illustrated in FIG. 3, care must be taken to account for processing delays to ensure that the encoded audio is properly synchronized with any video content in media file 302.

The server-side encoding may be implemented under a number of different options. A first option would be to implement a pre-encoded beacon, where the encoder (306) would be configured to perform real-time encoding of the audio beacon based on the content being served to the users/panelists. The user device would be equipped with a software decoder as described above which is invoked when media is played. The pre-encoded beacon would establish a message link which could be used, along with an identifier from the capturing portable device 140, in order to assign credit. The encoding shared library would preferably be resident at the content site (100) as part of the encoding engine. Such a configuration would allow the transcoding and encoding to be fit into the content site workflow.

Another option for server-side encoding could include a pre-encoded data load, where the audio is encoded with a message that is based on the metadata or the assigned URL. This establishes a message link which can be used, along with an identifier from the capturing portable device 140, in order to assign credit. The encoding shared library is preferably resident at the content site (100), as part of the encoding engine. Again, this configuration would allow the transcoding and encoding to be fit into the content site workflow.

Yet another option for server-side encoding could include "on-the-fly" encoding. If a video is being streamed to a panelist, encoding may be inserted in the stream along with a transcoding object. The encoding may be used to encode the audio with a simple one of N beacon, and the panelist user device 130 would contain software decoding which is invoked when the video is played. This also establishes a message link which can be used, along with an identifier from the capturing portable device 140, in order to assign credit. The encoding shared library is preferably resident at the content site (100), as part of the encoding engine. Under a preferred embodiment, an ActionScript would invoke the decoding along with a suitable transcoding object.

Figure 4:
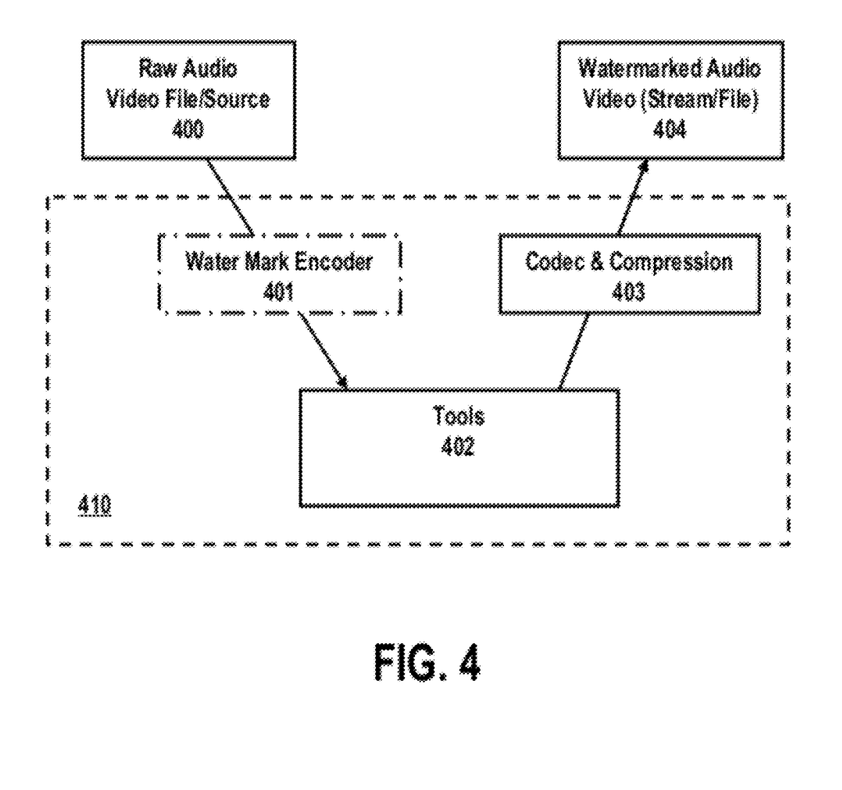
FIG. 4 illustrates an exemplary watermarking process for a digital media file suitable for use in the embodiment of FIGS. 1A-B.

FIG. 4 illustrates one embodiment for encoding media under a Flash Video platform 410, where the content is preferably encoded in advance. As raw audio from a video file or other source 400 is received, the audio is subjected to water mark encoding 401, which may include techniques described above for the encoding. Once encoded, the audio is formatted as a Flash file using ADOBE® Tools 402 such as FLV Creator and SWF Compiler. Once compiled, the file is further formatted using Flash-supported codecs (e.g., H.264, VP6, MPEG-4 ASP, Sorenson H.263) and compression 403 to produce a watermarked A/V stream or file 404.

Figure 5:
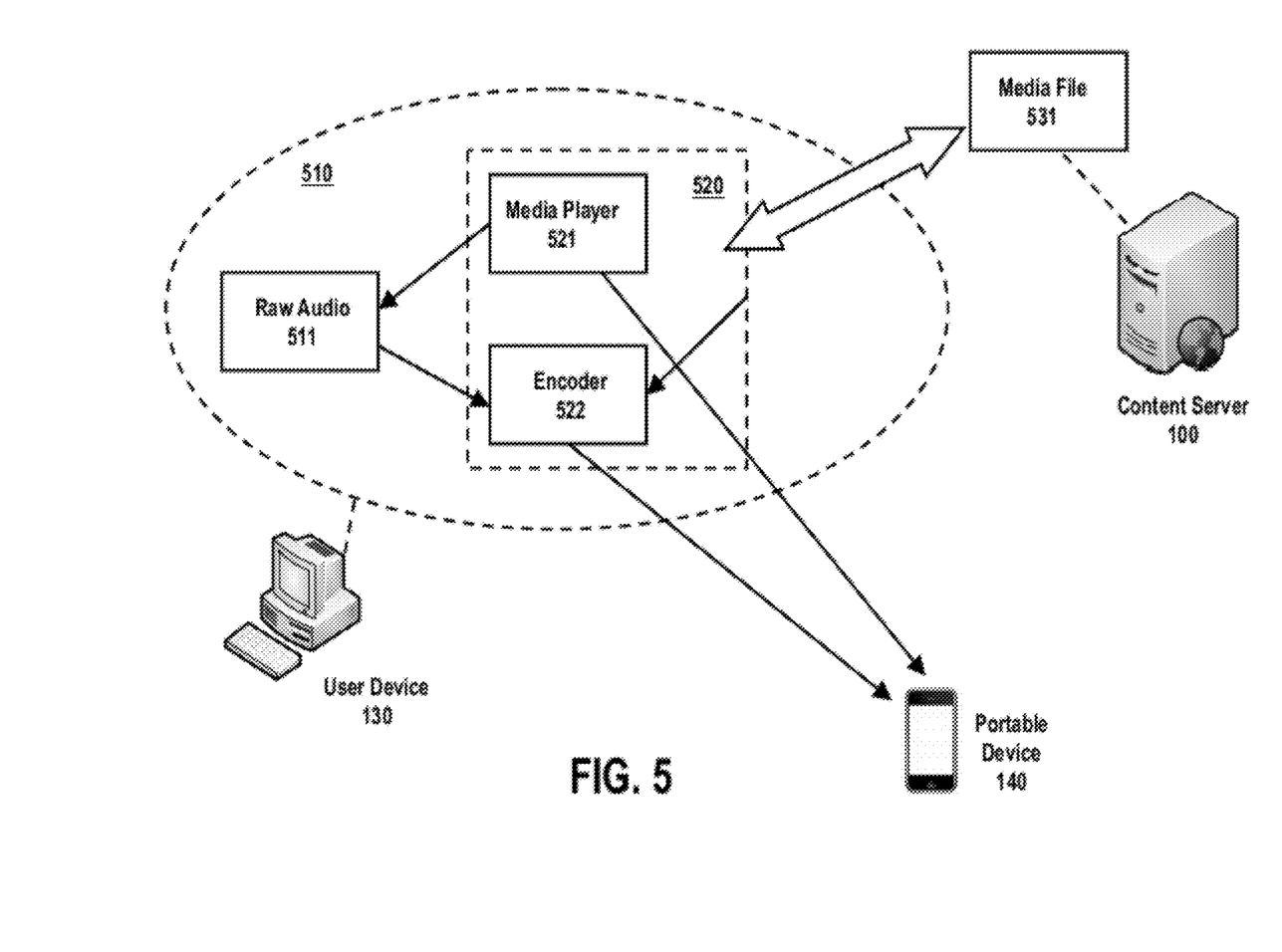
FIG. 5 illustrates a block diagram of a client-side encoding process under yet another exemplary embodiment.

FIG. 5 provides another alternate embodiment that illustrates client-side encoding and processing. In this example, user device 130 requests media data. In response to the request, a media file 531 residing on content server 100 is subsequently streamed to the device's browser 520 arranged on user's workspace 510. Media player 521 plays the streamed content and produces raw audio 511. A client-side ActionScript notifies browser 522 and encoder 522 to capture the raw audio on the device's sound mixer, or microphone (not shown), and to encode data using a suitable encoding technique described above. The encoding constructs the data for an independent audio beacon using the captured audio and other data (e.g., device ID, HHID, etc.) where portable device 140 picks up the beacon and forwards the data to an appropriate server for further processing and panel data evaluation.

Similar to the server-side embodiment disclosed in FIG. 3, care must be taken in the software to account for processing delays in audio pickup and (CBET) encoding of the audio beacon. Preferably, synchronization between audio beacon playback and audio playback (specifically FLV playback) should be accounted for. In alternate embodiments, communication between media player 521 and encoder 522 could be through Actionscript interface APIs, such as "ExternalInterface", which is an application programming interface that enables straightforward communication between ActionScript and a Flash Player container; for example, an HTML page with JavaScript, or a desktop application with Flash Player embedded, along with encoder application 522. To get information on the container application, an ActionScript interface could be used to call code in the container application, including a web page or desktop application. Additionally, ActionScript code could be called from code in the container application. Also, a proxy could be created to simplify calling ActionScript code from the container application.

For the panel-side encoding, a beacon embodiment may be enabled by having an encoding message being one from a relatively small set (e.g., 1 of 12), and where each user device 130 is assigned a different message. When portable device 140 detects the encoded message, it identifies the user device 130. Alternately, the encoding message may be a hash of the site and/or URL information gleaned from the metadata. When a panelist portable device 140 detects and reports the encoded message, a reverse hash can be used to identify the site, where the hash could be resolved on one or more remote server (e.g., sever 160).

In addition to the encoding techniques described above in connection with media content, a simplified beaconing configuration may be arranged where the beacon operates as a complement to media data, independent of the media data, or providing a beacon where no specially encoded data exists. Referred to herein as a "twinkle," the simplified beaconing comprises a constant amplitude acoustic signal or tone that is generated on user device 130. This acoustic tone is then automatically encoded, preferably with identification data (e.g., device ID, HHID and/or PPM ID) and a time-stamp. The encoded acoustic tone would then be forwarded to portable device 140 for processing and identification.

The acoustic tone used for the twinkle is preferably embodied as a pre-recorded constant amplitude tone that is transmitted at predetermined times. The encoding is preferably performed using any of the techniques described above. Under one embodiment, the simplified beaconing process would only forward the encoded, pre-recorded tone, independently of any audio data being received. Thus, referring back to FIG. 1, it is possible that user device 130 receives only other content 114 from content server 110 in the form of text-based HTML. As PC meter 132 records browsing information, the encoded tone is transmitted to portable device 140, where after further processing (see FIG. 1B), the user identification data is merged into internet measurement database 141. It is understood, that user device 140 may also receive audio data (encoded or unencoded) separately and in addition to other content. While the techniques described above would encode and forward audio data received, the simplified beacon ("twinkle") would also transmit ID information to portable device 140, which, in conjunction with PC meter 132, would subsequently merge panelist data into a common database.

Figure 6:
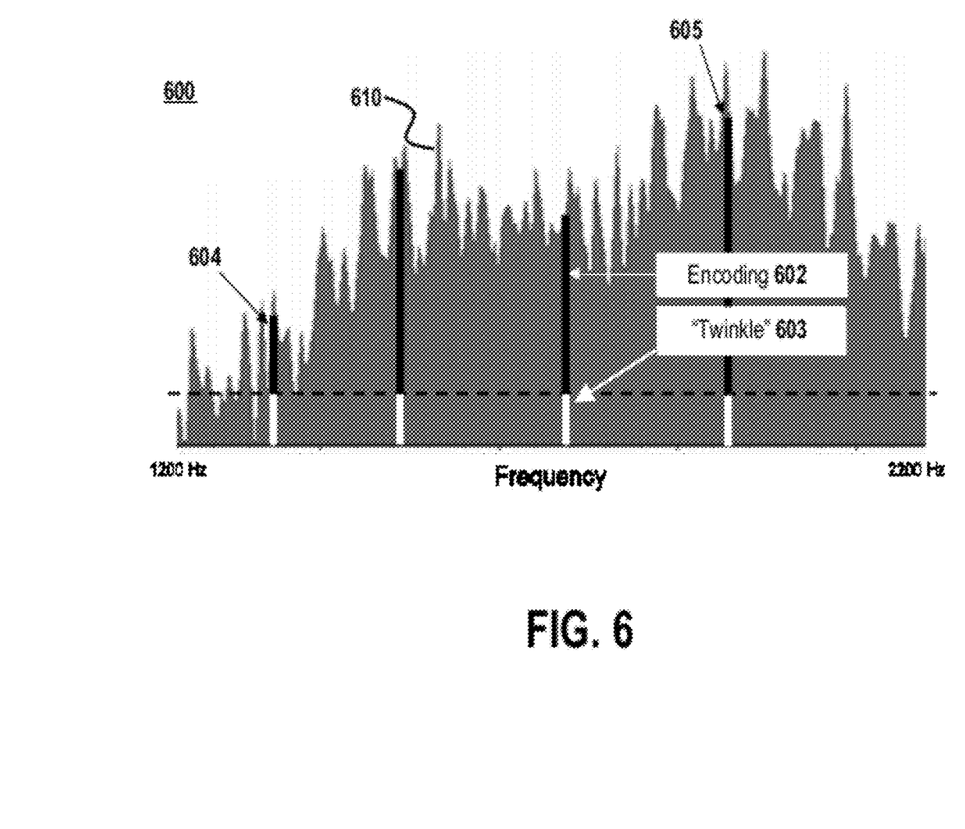
FIG. 6 illustrates an exemplary audio waveform having encoded data therein.

In another exemplary embodiment, FIG. 6 illustrates audio signal 600 represented as a spectrum of audio 610 over a period of time (e.g., 0.25 seconds), where the energy intervals vary with frequency between 1200 and 2200 Hz. Overlaid in black are discreet, narrowband code tones 602 (e.g., CBET) opportunistically inserted into the audio using the principles of psychoacoustic masking. For encoded tones, one of which is illustrated as 602 in FIG. 6, the energy of the inserted code tone varies with the level of audio, so more quiet portions of the frequency spectrum (e.g., 604) receive little encoding energy and compared to louder portions (e.g., 605), which get proportionally more.

In contrast, the simplified encoding ("twinkle") 603 is encoded and inserted at constant levels across the frequency spectrum, where the levels are independent of the audio levels. This allows the simplified encoding to be pre-recorded, easily generated and capable of being reused across various and/or different content. The simplified encoding could have the same message structure as the CBET encoding described above, utilizing a 10-tone symbol set. Alternately, other message structures are possible as well. As mentioned above, the twinkle may be transmitted automatically at regular intervals. Alternately the twinkle may be invoked by an ActionScript. If two players are utilized (i.e., one for the media, and one for the twinkle), the ActionScript could relay a beacon for the media from user device 130 to portable device 140, while simultaneously requesting a second (preferably invisible) Flash Player in the user device 130 to transmit the twinkle to portable device 140. Under a preferred embodiment, the ActionScript should invoke both players at a common volume setting.

In certain embodiments, it is advantageous to configure the audio beacon or "twinkle" on a device so that it is not intrusive and/or distracting to the user. Additionally, the beacon may be arranged to have audio characteristics that make it easier and more robust to encode. For example, simulated environmental sounds, such as power supply fans, air vent exhaust, crowd/audience noise, ocean waves and such may be used as the audio beacon sound in which encoded messages may be inserted. In another example, it is known that many computing devices, such as personal computers, phones, tablets and laptops, contain a pre-stored library of audio that is used to alert or notify users. By creating and storing sounds advantageously suited to encode data in the on-device sound library, a more robust beacon may be utilized. Furthermore, since the sound used for the beacon is known a priori, the encoding on the device may be simplified, since the time, frequency, masking and other encoding processes will be known.

Figure 7:
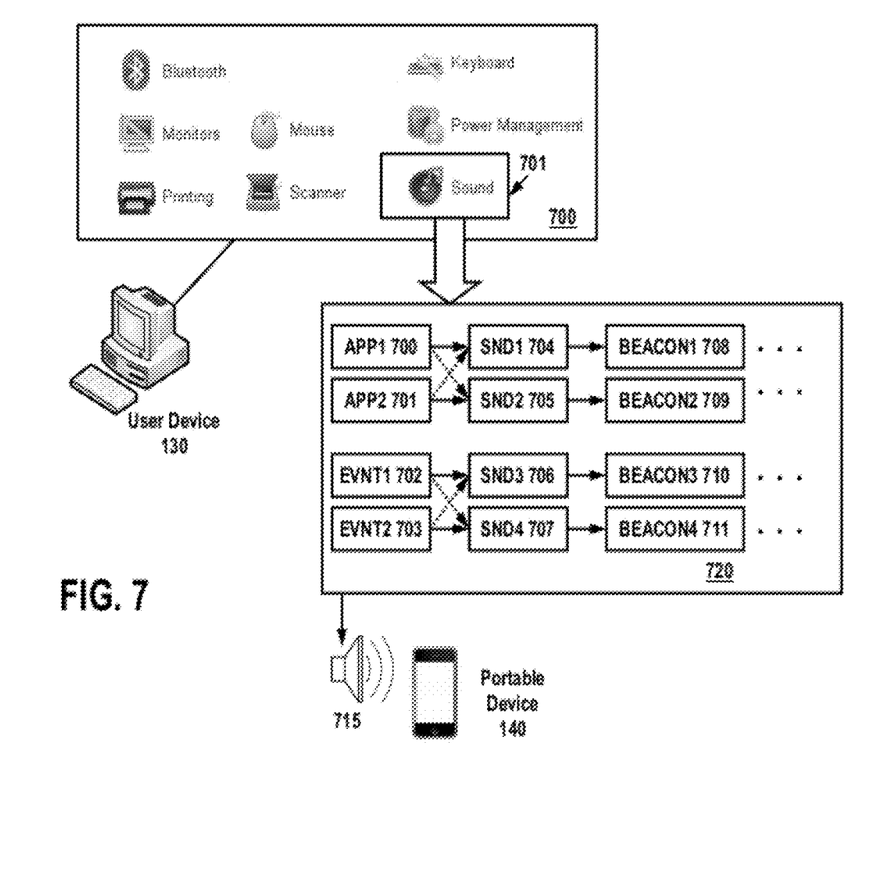
FIG. 7 illustrates an exemplary device configured to select environmental sounds for audio transmission.

Turning to FIG. 7, an exemplary embodiment is illustrated where user device 130 is configured with a control panel 700 that allows the device to control various aspects, including sound 701 that includes a resident sound library 720. In a preferred embodiment, a script, operating alone or as part of meter software (see FIG. 1A, ref. 132), may control aspects of sound library 720, such that specific sounds are used for audio beacon encoding. Of course, it is possible for a user to manually change these features either directly through user device 130, or through a remote connection.

Sound library 720 comprises audio sounds (704-707) that are associated with one or more software applications 700-701 and/or events 702-703. "Events," for the purposes of FIG. 7, include notifications (e.g., receipt of email, social networking software status update, etc.) and alerts (e.g., start-up, shut-down, application error, etc.) that are made pursuant to the device's operating system and associated software running on the device. In this example, a first application (APP1) 700 and a second application (APP2) 701 are associated with respective sounds 704-705 that may be triggered when the application is activated, or at predetermined times determined by the specific application. Applications 700-701 may include metering software 132 discussed above in connection with FIG. 1A.

In one embodiment, each sound 704, 705 is associated with a respective application 700, 701. The sounds (704-705) are used for encoding messages to form respective beacons (708-709). As data for the audio beacon is being collected on user device 130 (e.g., user device ID, web hash, etc.), the sound (e.g., 704) is copied, data is encoded into it and the encoded copy is stored in a buffer or other suitable memory. As further data for an audio beacon is collected, another copy of the original sound (704) is made, and the further data is encoded and stored into the buffer/memory. This process repeats for as long as necessary to form a string of encoded sounds. The sounds may be arranged sequentially or in other suitable formats. When an application 700 triggers a sound, a first beacon 708 is audibly transmitted. When the next trigger occurs, the next beacon is audibly transmitted, and so on, until the buffer/memory is empty, or a predetermined amount of time has expired. In another embodiment, one application can control a plurality of sounds (704-705) and produce a plurality of encoded beacons (708-709).

Continuing with FIG. 7, events 702-703 may be associated with respective sounds 706-707, similar to applications 700-701 discussed above, to produce beacons 710-711. This configuration may be particularly advantageous to beacon information when a user performs an act on the device, such as open/close a browser window, open/close a tab on a browser, open/close an application, etc. As data for the audio beacon is being collected (e.g., user device ID, web hash, etc.), the sound (e.g., 706) is copied, data is encoded into it and the encoded copy is stored in a buffer or other suitable memory. As further data for an audio beacon is collected, another copy of the original sound (706) is made, and the further data is encoded and stored into the buffer/memory. This process repeats for as long as necessary to form a string of encoded sounds. Again, the sounds may be arranged sequentially or in other suitable formats. When an event (702) is detected, a first beacon 710 is audibly transmitted. When the next event occurs, the next beacon is audibly transmitted, and so on, until the buffer/memory is empty, or a predetermined amount of time has expired.

As mentioned previously, the sounds 704-707 are preferably predetermined and may simulate an environmental sound so as not to be intrusive or distracting to the user. Additionally, the sound may be selected to contain audio characteristics (e.g., having high masking levels in critical frequency bands) that makes it conducive to robust audio encoding. By using a predetermined sound for the audio beacon encoding, designers can have more flexibility in audibly beaconing data. In addition to audio characteristics, the predetermined sounds may have different lengths as well. In an example where an application (700) controls multiple sounds, the sounds may be the same instance of one sound, but having different lengths (e.g., 5 sec., 10 sec., etc.). In cases where a device's (130) volume is lower, the application may default to a longer sound to increase the probability of the beacon code being detected. If the volume increases, the device 130 can switch to a shorter sound. This configuration has the added benefit of ensuring that users maintain a sufficient volume on their device to avoid longer (and possibly more intrusive) beacons.

Various embodiments disclosed herein provide devices, systems and methods for performing various functions using an audience measurement system that includes audio beaconing. Although specific embodiments are described herein, those skilled in the art recognize that other embodiments may be substituted for the specific embodiments shown to achieve the same purpose. As an example, although terms like "portable" are used to describe different components, it is understood that other, fixed, devices may perform the same or equivalent functions. Also, while specific communication protocols are mentioned in this document, one skilled in the art would appreciate that other protocols may be used or substituted. This application covers any adaptations or variations of the present invention. Therefore, the present invention is limited only by the claims and all available equivalents.

What is claimed is:

1. A method for measuring and communicating media exposure, the method comprising:
   in response to a change of a volume setting of a user device after receiving, at the user device, data provided via a web page accessed by the user device:
      switching, at the user device by executing an instruction with a processor and based on the volume setting of the user device, from a second sound signal previously selected to be encoded with a code signal to a first sound signal to be encoded with the code signal, the first sound signal having a first duration, the first sound signal selected from a library of beacon sound signals stored at the user device, the library of beacon sound signals including beacon sound signals having different durations of a same type of sound; and
      after the switching from the second sound signal to the first sound signal, embedding, at the user device by executing an instruction with the processor, the code signal, which is encoded with an identifier associated with the user device and information identifying the accessed web page, into the first sound signal to determine an encoded first sound signal; and
   outputting the encoded first sound signal from the user device to a remote location for media exposure processing.

2. The method according to claim 1, wherein the identifier includes at least one of a unique user device identifier, a household identifier, or a portable device identifier.

3. The method according to claim 1, wherein the identifier is audibly imperceptible when the encoded first sound signal is played.

4. The method according to claim 1, wherein the data includes non-audio data provided via the web page accessed by the user device.

5. The method according to claim 1, wherein the beacon sound signals are associated with applications executing on the user device, and the outputting of the encoded first sound signal is triggered by a first one of the applications.

6. The method according to claim 1, wherein the beacon sound signals are associated with events capable of being performed by the user device, and the outputting of the encoded first sound signal is triggered by a first one of the events.

7. An article of manufacture comprising instructions that, when executed, cause a user device to at least:
   in response to a change of a volume setting of a user device after having received, at the user device, data provided via a web page accessed by the user device:
      switch, based on the volume setting of the user device, from a second sound signal previously selected to be encoded with a code signal to a first sound signal to be encoded with the code signal, the first sound signal having a first duration, the first sound signal selected from a library of beacon sound signals stored at the user device, the library of beacon sound signals including beacon sound signals having different durations of a same type of sound; and
      after having switched from the second sound signal to the first sound signal, embed, at the user device, the code signal, which is encoded with an identifier associated with the user device and information identifying the accessed web page, into the first sound signal to determine an encoded first sound signal; and
   output the encoded first sound signal from the user device to a remote location for media exposure processing.

8. The article of manufacture according to claim 7, wherein the identifier includes at least one of a unique user device identifier, a household identifier, or a portable device identifier.

9. The article of manufacture according to claim 7, wherein the data includes non-audio data provided via the web page accessed by the user device.

10. The article of manufacture according to claim 7, wherein the beacon sound signals are associated with applications executing on the user device, and the outputting of the encoded first sound signal is triggered by a first one of the applications.

11. The article of manufacture according to claim 7, wherein the beacon sound signals are associated with events capable of being performed by the user device, and the outputting of the encoded first sound signal is triggered by a first one of the events.

12. A user device comprising:
a beacon processor to:
respond to a change of a volume setting of the user device after having received, at the user device, data provided via an accessed web page by:
switching, based on the volume setting of the user device, from a second sound signal previously selected to be encoded with a code signal to a first sound signal to be encoded with the code signal, the first sound signal having a first duration, the first sound signal selected from a library of beacon sound signals stored at the user device, the library of beacon sound signals including beacon sound signals having different durations of a same type of sound; and
after having switched from the second sound signal to the first sound signal, embedding, at the user device, the code signal, which is encoded with an identifier associated with the user device and information identifying the accessed web page, into the first sound signal to determine an encoded first sound signal; and
output the encoded first sound signal from the user device to a remote location for media exposure processing; and
memory to store the library of beacon sound signals.

13. The user device according to claim 12, wherein the identifier includes at least one of a unique user device identifier, a household identifier, or a portable device identifier.

14. The user device according to claim 12, wherein the data includes non-audio data provided via the web page accessed by the user device.

15. The user device according to claim 12, wherein the beacon sound signals are associated with applications executing on the user device, and the outputting of the encoded first sound signal is triggered by a first one of the applications.

16. The user device according to claim 12, wherein the beacon sound signals are associated with events capable of being performed by the user device, and the outputting of the encoded first sound signal is triggered by a first one of the events.

17. The method according to claim 1, wherein the first duration of the first sound signal is longer than a second duration of the second sound signal, and the switching from the second sound signal to the first sound signal based on the volume setting of the user device includes switching from the second sound signal to the first sound signal when the volume setting of the user device is changed to a lower setting than a volume setting of the user device when the second sound signal was previously selected to be encoded with the code signal.

18. The article of manufacture according to claim 7, wherein the first duration of the first sound signal is longer than a second duration of the second sound signal, and the instructions, when executed, further cause the user device to switch from the second sound signal to the first sound signal and not the second sound signal when the volume setting of the user device is changed to a lower setting than a volume setting of the user device when the second sound signal was previously selected to be encoded with the code signal.

19. The user device according to claim 12, wherein the first duration of the first sound signal is longer than a second duration of the second sound signal, and the beacon processor is further to switch from the second sound signal to the first sound signal when the volume setting of the user device is changed to a lower than a volume setting of the user device when the second sound signal was previously selected to be encoded with the code signal.

* * * * *

UNITED STATES PATENT AND TRADEMARK OFFICE
CERTIFICATE OF CORRECTION

PATENT NO. : 10,008,212 B2
APPLICATION NO. : 13/338588
DATED : June 26, 2018
INVENTOR(S) : Wendell Lynch et al.

Page 1 of 1

It is certified that error appears in the above-identified patent and that said Letters Patent is hereby corrected as shown below:

In the Claims

Column 16, Line 28 (Claim 18): delete "and not the second sound signal"

Signed and Sealed this
Nineteenth Day of March, 2019

Andrei Iancu
*Director of the United States Patent and Trademark Office*